US010844497B2

(12) United States Patent
Beachy et al.

(10) Patent No.: US 10,844,497 B2
(45) Date of Patent: Nov. 24, 2020

(54) ELECTROCHEMICAL CELL AND METHOD OF USING SAME

(71) Applicant: pH Matter, LLC, Columbus, OH (US)

(72) Inventors: Michael G. Beachy, Gahana, OH (US); Christopher T. Holt, Bexley, OH (US); Minette Ocampo, Columbus, OH (US); Paul H. Matter, Columbus, OH (US)

(73) Assignee: Power to Hydrogen, LLC, Columbus, OH (US)

( * ) Notice: Subject to any disclaimer, the term of this patent is extended or adjusted under 35 U.S.C. 154(b) by 243 days.

(21) Appl. No.: 15/957,052

(22) Filed: Apr. 19, 2018

(65) Prior Publication Data

US 2018/0327917 A1 Nov. 15, 2018

Related U.S. Application Data

(60) Provisional application No. 62/487,134, filed on Apr. 19, 2017.

(51) Int. Cl.
| | |
|---|---|
| *C25B 9/08* | (2006.01) |
| *C25B 1/10* | (2006.01) |
| *H01M 8/2483* | (2016.01) |
| *H01M 8/083* | (2016.01) |
| *H01M 4/86* | (2006.01) |
| *H01M 8/18* | (2006.01) |
| *H01M 8/24* | (2016.01) |

(Continued)

(52) U.S. Cl.
CPC .............. *C25B 9/08* (2013.01); *C25B 1/10* (2013.01); *H01M 4/8668* (2013.01); *H01M 8/0289* (2013.01); *H01M 8/083* (2013.01); *H01M 8/186* (2013.01); *H01M 8/2455* (2013.01); *H01M 8/2459* (2016.02); *H01M 8/2483* (2016.02); *H01M 2300/0014* (2013.01); *H01M 2300/0082* (2013.01)

(58) Field of Classification Search
CPC combination set(s) only.
See application file for complete search history.

(56) References Cited

U.S. PATENT DOCUMENTS

| | | | |
|---|---|---|---|
| 4,909,912 A | * | 3/1990 | Oda .......................... C25B 1/46 |
| | | | 205/524 |
| 6,447,942 B1 | | 9/2002 | Ovinsky |
| 7,943,258 B2 | | 5/2011 | Gottesfeld |

(Continued)

OTHER PUBLICATIONS

International Search Report and Written Opinion of the International Searching Authority for International Application No. PCT/US18/28300, dated Aug. 30, 2018, 19 pages.

(Continued)

*Primary Examiner* — Christopher P Domone
(74) *Attorney, Agent, or Firm* — Michael J. Gallagher, Esq.; Luper Neidenthal & Logan, LPA

(57) ABSTRACT

A novel electrochemical cell is disclosed in multiple embodiments. The instant invention relates to an electrochemical cell design. In one embodiment, the cell design can electrolyze water into pressurized hydrogen using low-cost materials. In another embodiment, the cell design can convert hydrogen and oxygen into electricity. In another embodiment, the cell design can electrolyze water into hydrogen and oxygen for storage, then later convert the stored hydrogen and oxygen back into electricity and water.

18 Claims, 11 Drawing Sheets

(51) Int. Cl.
  *H01M 8/0289*  (2016.01)
  *H01M 8/2455*  (2016.01)

(56) References Cited

U.S. PATENT DOCUMENTS

| | | |
|---|---|---|
| 2003/0059664 A1 | 3/2003 | Menjak |
| 2006/0057436 A1 | 3/2006 | Osenar |
| 2009/0035625 A1* | 2/2009 | Ohkawa .............. H01M 4/8615 |
| | | 429/532 |
| 2009/0081501 A1* | 3/2009 | Vu .................... H01M 8/04201 |
| | | 429/436 |
| 2010/0021777 A1 | 1/2010 | Gottesfeld |

OTHER PUBLICATIONS

Dieter Von Deak, Elizabeth J. Biddinger, Katherine A. Luthman, Umit S. Ozkan, The Effect of phosporus in nitrogen-containing carbon nanostructures on oxygen reduction in PEM fuel cells, May 13, 2010, The William G. Lowrie Department of Chemical and Biomolecular Enginerring, The Ohio State University, Columbus, OH, 3 pages.

J.R. Pels, F. Kapteijn, JA Mouljin, Q. Zhu, K.M. Thomas, Evolution of Nitrogen Functionalities in Carbonaceous Materials During Pyrolysis, August 7, 1995, Northern Carbon Research Laboratories, Department of Chemistry, University of Newcastle upon Tyne, U.K. 13 pages.

\* cited by examiner

ELECTROCHEMICAL CELL AND METHOD OF USING SAME

CROSS-REFERENCE TO RELATED APPLICATIONS

This application claims the benefit of U.S. Provisional Patent Application 62/487,134; filed Apr. 19, 2017.

STATEMENT REGARDING FEDERALLY SPONSORED RESEARCH OR DEVELOPMENT

This invention was made with government support under Department of Energy Contract Number DE-SC0013111. The government may have certain rights in the invention.

TECHNICAL FIELD

The present disclosure relates generally to an electrochemical cell and a method of using the same.

BACKGROUND OF THE INVENTION

Energy storage is required to maintain reliable electricity delivery from energy producers to their customers. As electrical loads on the grid change throughout the day, stored energy supplies electricity during increased power demand periods. Further, as more renewable and alternative energy sources are added, energy storage will maximize the usefulness of these technologies. As energy demands continue to expand, and more renewable energy, i.e., wind and solar, is added to the grid, new distributed energy storage technologies will be needed that are not dependent on geographic features.

Battery technologies can provide energy storage for some applications but are not economically well-suited for long-duration charge/discharge, such as load-leveling of renewable energy. Consequently, development of new energy storage devices will augment the existing grid and reduce the capital investment in construction upgrades. As ever-increasing renewable energy is implemented, lower-cost energy storage solutions for renewable energy will be necessary to keep electricity costs low for consumers.

Regenerative fuel cells offer a unique solution for grid energy storage. Unlike batteries, regenerative fuel cells can cost-effectively store a large amount of energy in the form of hydrogen. Energy in the form of hydrogen can be stored at a cost of about $35/kW-hr for steel tanks, significantly lower than the cost of batteries. Regenerative fuel cells or electrolysis systems could also provide an added benefit of hydrogen generation for fuel cell vehicles. Unfortunately, there are several limitations with existing technology for regenerative fuel cell and electrolysis systems.

Currently, two technologies are used commercially for water electrolysis. Alkaline electrolyzers are an established technology that rely on two electrodes in a liquid electrolyte. These electrodes are typically separated by a non-electrically-conductive porous layer, called the separator. Through application of a voltage, hydrogen and oxygen are evolved from the cathode and anode, respectively. Due to the permeability of the separator, the hydrogen gas cannot be pressurized substantially through electrochemical means. Small differences in pressure between the two sides of the cell can cause catastrophic cell failures. A mechanical compressor is typically used for hydrogen compression, requiring an additional system component that is exceedingly expensive for many scales and applications.

The second common method for water electrolysis is a proton exchange membrane (PEM) electrolyzer. This technology uses a gas-impermeable polymer membrane as the electrolyte. Water vapor or liquid water is fed to at least one of the electrodes. The gases can be easily compressed electrochemically with a PEM electrolyzer, and the cells can operate with pressure differences greater than 100 bar. PEM electrolyzers can also be made to operate reversibly, producing electricity and water from hydrogen and oxygen. The drawback of PEM electrolyzers and PEM reversible fuel cells is the cost of the components. The acidic electrolyte and electrolysis operating voltages necessitate the selection of expensive components for long-term stability. Platinum and Iridium may be used as electrode catalysts. Additionally, electrode current collectors must be fabricated of corrosion-resistant materials. PEM electrolysis systems are consequently too expensive for wide-scale commercial adoption for many grid-scale energy storage applications.

With the development of polymer membranes, known as Anion Exchange Membranes (AEMs), that conduct hydroxide ions and other anions, low-cost cells that can produce pressurized hydrogen have become possible. However, hydrocarbon-based AEMs have challenges with remaining conductive if operated in the absence of liquid water. Further, without liquid electrolyte present, ionomers in the electrode layer are required to introduce ion conduction beyond the 2-dimensional electrolyte/electrode interface, a necessity for obtaining high areal current density.

U.S. Pat. No. 7,943,258 discloses an AEM fuel cell design that illustrates the challenges found with AEM cell designs. This patent uses an AEM as the electrolyte and ionomer in the electrode layers. Those skilled in the art would appreciate that keeping an AEM hydrated and active for more than a few hours in the absence of liquid electrolyte is very challenging. In the '258 patent, the membrane is kept in a constant hydrated state by delivery of water to the edge of the membrane, outside of the active electrode area, through several unique designs. In the absence of liquid electrolyte, ionomers are required in the electrode layer of this cell design to enable ion conduction to permeate the electrode and operate at substantial current density. While the cell design would be expected to operate well as a fuel cell utilizing pure hydrogen and pure oxygen, it would be expected to slowly lose performance in the presence of carbon dioxide in the fuel or oxidant. Further, this cell design is not conducive to electrolysis operation for several reasons.

First, hydrocarbon ionomers used in the oxygen electrode would not be stable under typical electrolysis voltages. Second, the wicking mechanism used to deliver water to hydrate the membrane would not deliver water to the cell at a sufficient rate to match the water consumption during high current electrolysis.

Using liquid electrolytes, alkaline cell designs have been demonstrated for electrolysis and reversible fuel cell/electrolysis operation. U.S. Pat. No. 6,447,942 discloses a reversible fuel cell design with an alkaline liquid electrolyte. The design uses a porous separator between the electrodes. Another liquid electrolyte cell design is disclosed in United States Patent Application No. 2006/0057436A1. This design also utilizes a porous diaphragm separator. In both designs, the cells would be susceptible to carbon oxide contaminants in the fuel or oxidant when operated as a fuel cell. In the oxidant, over long-term operation, carbon dioxide would result in precipitation of carbonates in the cathode, thus blocking gas flow. In the fuel, anode catalysts, such as platinum or nickel, would be poisoned by carbon dioxide.

Carbon dioxide could similarly precipitate as carbonates, blocking gas flow in the anode. In both cases, the cell designs would not permit significant pressurization of the product gases during electrolysis, because of the need for a porous separator. Consequently, while liquid electrolyte alkaline fuel cells and reversible alkaline fuel cells may work for many ideal cases, they have significant limitations.

A common design for electrolysis cells is the combination of a gas-impermeable membrane separator with electrodes flooded by water and/or electrolyte. U.S. Pat. No. 4,909,912 discloses such a design. This design is not practical for fuel cell operation because gas cannot be fed to catalysts in the flooded electrodes at a sufficient rate to generate high current density. Beyond not being useful as a fuel cell design, limitations with this cell design for electrolysis are that additional water and product gas separation steps are required to recover the product. Further, corrosion on the anode, i.e., the oxygen evolving electrode for water electrolysis, can be severe for any components in contact with the electrolyte. In this cell design, current collectors and bi-polar plates would be in contact with the electrolyte, exposing them to potentially corrosive electrochemical reactions.

SUMMARY OF THE INVENTION

The instant invention as disclosed in multiple embodiments, all meant by way of example only and not limitation, and includes a cell design that solves the limitations of existing liquid electrolyte cells and AEM cell designs. The design, in multiple embodiments, enables much lower cost components than PEM electrolyzers and reversible fuel cells. The design, in multiple embodiments, may utilize a combination of at least one gas-impermeable AEM in contact with a liquid electrolyte, with at least one electrode not flooded by liquid, thus allowing gas flow at a high rate in to and/or out of the electrode. The gas-impermeable AEM can be any AEM material that is substantially gas-impermeable and conducts anions, including any membrane material that is impermeable to gas and conducts hydroxide anions.

In another preferred embodiment, aqueous KOH may be used as the liquid electrolyte component. However, in various embodiments, liquid electrolytes may include any aqueous salt solution with a pH>7. In another preferred embodiment of the cell design, two AEMs separated by a porous layer may be permeated with aqueous liquid electrolyte that may be used to separate the electrodes. The electrodes can be any layer in which an electrochemical reaction takes place. In another preferred embodiment, the electrodes would consist of a hydrogen electrode in which hydrogen evolution and hydrogen oxidation can occur, and an oxygen electrode in which oxygen evolution and oxygen reduction can occur.

In other embodiments these electrodes may be useful for oxygen reduction, oxygen evolution, hydrogen reduction, hydrogen evolution, fluorine evolution, chlorine evolution, bromine evolution, iodine evolution, and a number of other electrochemical reactions.

A porous matrix, placed between two AEM layers, may be conductive or non-conductive. In another preferred embodiment, the porous layer may be nickel metal foam, and may be permeated with aqueous potassium hydroxide. In an embodiment of the cell design, at least one electrode uses an ionomer to achieve optimal performance.

In another preferred embodiment, a hydrogen electrode uses an anion-conducting ionomer. In yet another preferred embodiment, the oxygen electrode uses a fluorinated binder and/or a fluorinated ionomer.

In an additional preferred embodiment, at least one electrode uses a mixture of hydrophilic and hydrophobic fluorinated binder. In another preferred embodiment, both electrodes are not flooded with liquid but the membrane may be in contact with aqueous electrolyte, allowing operation as a fuel cell and/or electrolyzer. In yet another preferred embodiment, the liquid electrolyte may be stored in an external reservoir and circulated through the electrode separator layer.

In another embodiment, the cell operates as a fuel cell with air as the oxidant. The liquid electrolyte in contact with the AEM prevents the AEM from being converted to its carbonate form. In one embodiment of the cell, the hydrogen electrode contains a non-Ni and non-Pt catalyst that is not severely poisoned by small quantities of carbon monoxide. In one embodiment of the cell, the anode operates on a hydrogen-containing fuel that also contains carbon monoxide and carbon dioxide.

In another embodiment the cell operates as fuel cell. In another embodiment the cell operates as an electrolyzer. In another embodiment the cell operates as both a fuel cell and electrolyzer. In another embodiment the cell operates as an electrolyzer with an oxygen depolarized cathode.

BRIEF DESCRIPTION OF THE ILLUSTRATIONS

Without limiting the scope of the electrochemical cell as disclosed herein and referring now to the drawings and figures.

Figure 7:
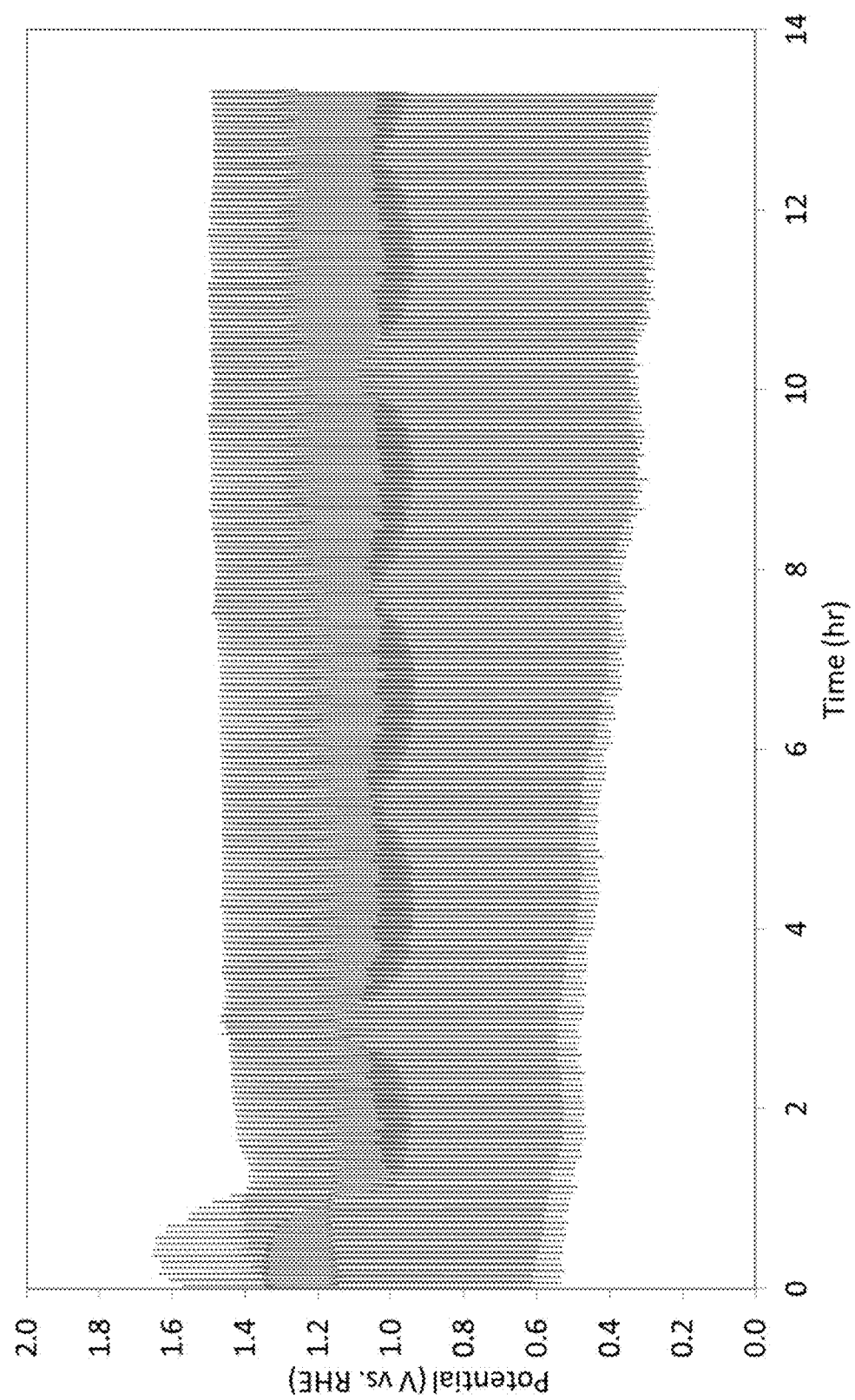
Figure 8:
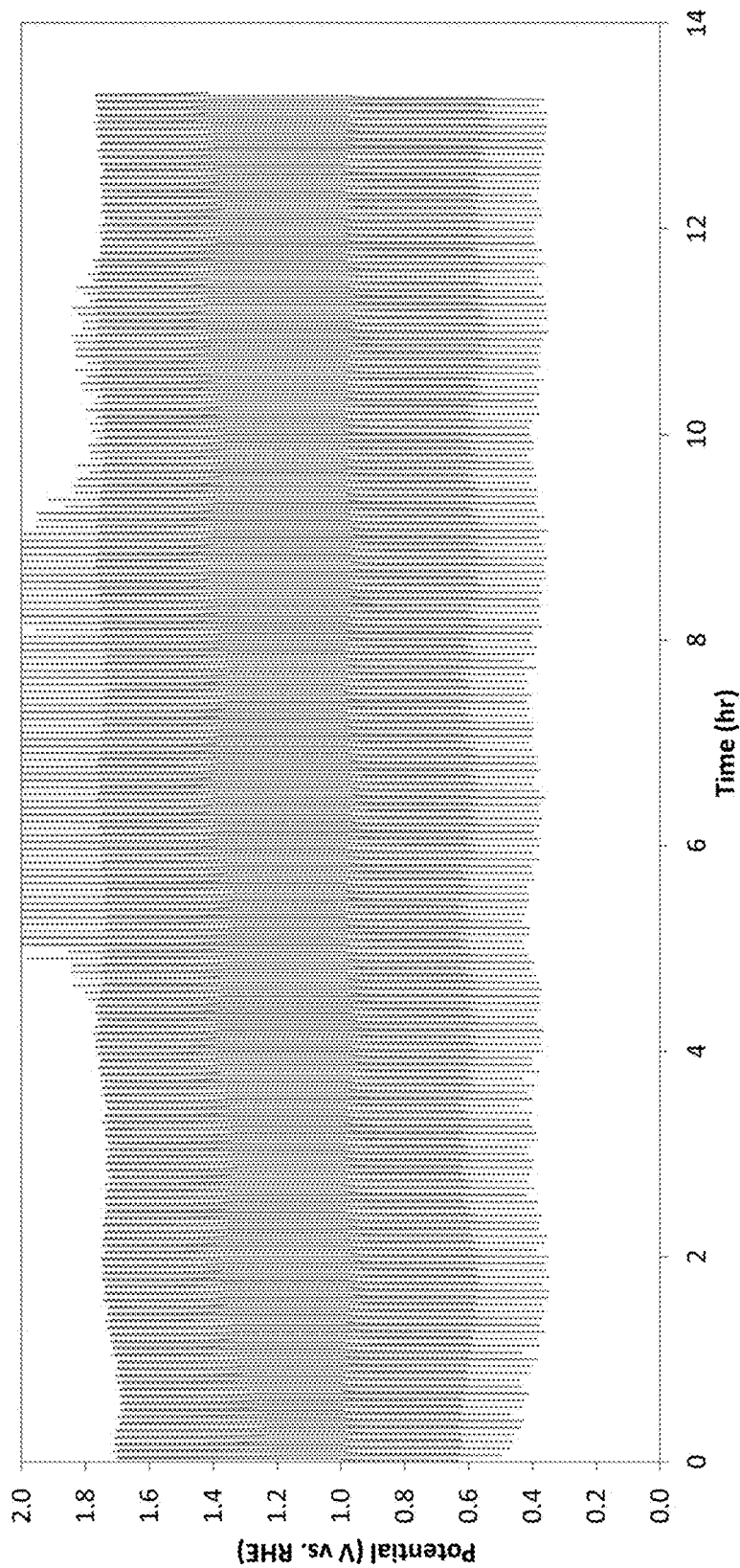

FIG. 7 shows exemplary oxygen electrode voltage for an electrode with a hydrocarbon-based anion-conducting ionomer at 45° C. in humidified oxygen (25° C. dew point); 200 cycles at 40 mA/cm$^2$ oxygen evolution, 200 mA/cm' oxygen reduction with 1 minute relaxation; and FIG. 8 shows exemplary oxygen electrode voltage for an electrode with a sulfonated tetrafluoroethylene based fluoropolymer-copolymer (hereafter, "NAFION®," E. I. Dupont de Nemours and Co., Wilmington, Del., USA) ionomer/binder at 45° C. in humidified oxygen (25° C. dew point); 200 cycles at 40 mA/cm² oxygen evolution, 200 mA/cm² oxygen reduction with 1 minute relaxation.

These illustrations are provided to assist in the understanding of the exemplary embodiments of an electrochemical cell, and a method for using the same, as described in more detail below, and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The instant invention as disclosed in multiple embodiments, all meant by way of example only and not limitation, and includes a cell design that solves the limitations of existing liquid electrolyte cells and AEM cell designs. The design, in multiple embodiments, enables much lower cost components than PEM electrolyzers, reversible fuel cells and conventional liquid electrolyte electrolyzers. The design, in multiple embodiments, may utilize a combination of at least one gas-impermeable AEM in contact with a liquid electrolyte, with at least one electrode not flooded by liquid, thus allowing gas flow at a high rate in to and/or out of the electrode. The gas-impermeable AEM can be any AEM material that is substantially gas-impermeable and conducts anions, including any membrane material that is impermeable to gas and conducts hydroxide anions.

These include cationic polymer membranes, anion-conducting ceramic membranes, cationic polymer membranes mechanically supported by a mesh or porous substrate, polymer membranes with a cation functional group, polymers with N+H3R functional group, polymers with N+H2R2 functional group, polymers with N+HR3 functional group, polymers with N+R4 functional group, polymers with P+ functional group, and mixtures thereof. One skilled in the art will readily visualize other possible materials and combinations of the same.

In a preferred embodiment, aqueous KOH may be used as the electrolyte. However, in various embodiments, electrolytes may include any aqueous salt solution with a pH>7; including, Group I, Group II, and Transition Metal Hydroxides, Group I, Group II, and Transition Metal Carbonates, Group I, Group II, and Transition Metal Bicarbonates, Group I, Group II, and Transition Metal Acetates, ammonium hydroxide, ammonium carbonate, ammonium bicarbonate, and combinations thereof. The liquid electrolyte can be any high pH aqueous solution, including those noted above, again by way of example only and not limitation.

In a preferred embodiment of the cell design, two AEMs may be separated by a porous matrix layer that may be permeated with aqueous liquid electrolyte. The AEMs and porous matrix are used to separate the electrodes. The electrodes can be any layer in which an electrochemical reaction takes place. In a preferred embodiment the electrodes would consist of a hydrogen electrode in which hydrogen evolution and hydrogen oxidation can occur, and an oxygen electrode in which oxygen evolution and oxygen reduction can occur. As would be known to one skilled in the art; electrode layers may include gas diffusion electrodes or may include flooded electrodes. Examples of electrodes may include catalyst coatings on a backing support, and metallic electrodes. Examples of metallic electrodes further include stainless steel mesh, nickel mesh, titanium mesh, platinum mesh, coated meshes, metallic foams, metallic sponges, and mixtures thereof. Examples of a backing supports include carbon cloth, carbon paper, metallic foam, metallic meshes, expanded metal mesh, and mixtures thereof. Examples of electrode catalysts may include transition metals, such as group 3, 4, 5, 6, 7, 8, 9, 10, 11, and 12 transition metals, alloys of these transition metals, and mixtures thereof.

Specifically, Ti, Cr, Mo, W, Mn, Fe, Co, Ni, Cu, Zn, Ru, Os, Rh, Pd, Ag, Ir, Pt, Au, and Hg are well-known as electrode catalysts to those skilled in the art. Carbides, borides, nitrides, oxides, sulfides, and phosphides of transition metals are also well-known as electrode catalysts to those skilled in the art. Additional catalysts well-known to those skilled in the art include B, Al, Ga, In, Sn, Pb, Sb, Bi, and C. Elemental forms, carbide forms, boride forms, nitride forms, oxide forms, sulfide forms, phosphide forms, and mixtures thereof of catalysts are well-known as electrode catalysts to those skilled in the art. Carbon catalysts may come in a number of forms, including graphite, graphene, single-walled nano-tubes, multi-walled nano-tubes, nano-fibers, spherical particles, amorphous particles, core-shell particles, and mixtures thereof. Carbon catalysts may be doped with a number of elements, including transition metal atoms, B, N, P, O, S, F, Cl, Br, and mixtures thereof.

Electrode catalyst examples also include metal-organic frameworks, conductive polymers, pyrolysis products of hydrocarbons, pyrolysis products of polymers, and mixtures thereof. Catalysts often consist of mixtures of known catalysts. These electrode catalysts may be useful for oxygen reduction, oxygen evolution, hydrogen reduction, hydrogen evolution, fluorine evolution, chlorine evolution, bromine evolution, iodine evolution, and a number of other electrochemical reactions. Electrode catalysts for any gas-evolving or gas-consuming electrochemical reaction may be useful in the instant invention.

The porous matrix, placed in contact with at least one AEM or between two AEM layers, may be conductive or non-conductive. Examples of the porous matrix include: Any open-cell porous material, porous polypropylene, porous polyethylene, asbestos, porous PTFE, metal foam, ceramic foam, nickel metal foam, carbon paper, carbon cloth, carbon sponge, carbon fabric, metal cloth, ceramic cloth, metal sponge, polymer sponge, ceramic sponge, natural sponge, ceramic fabric, metal fabric, polymer fabric, multi-layer etched polymer membrane with flow-through channels, etched or cut channels in a thin sheet, woven mesh, non-woven mesh, and combinations thereof. One skilled in the art will readily visualize other possible materials and combinations of the same.

In a preferred embodiment, the porous layer may be nickel metal foam, and may be permeated with aqueous potassium hydroxide. In an embodiment of the cell design, at least one electrode uses an ionomer to achieve optimal performance. Examples of ionomers include any dispersible polymeric material that conducts ions, including anionic polymers, cationic polymers, anion-conducting ceramic particles, polymers with N+H3R functional group, polymers with N+H2R2 functional group, polymers with N+HR3 functional group, polymers with N+R4 functional group, polymers with P+ functional group, anionic polysiloxanes, and mixtures thereof. In some embodiments, AEM ionomers, which are dissolved molecules of similar structure to a polymer used to make a corresponding AEM, may be utilized. One skilled in the art will again readily visualize other possible materials and combinations of the same.

In another preferred embodiment, a hydrogen electrode uses an anion-conducting ionomer. In yet another preferred embodiment, the oxygen electrode uses a fluorinated binder and fluorinated ionomer. Examples of fluorinated ionomers include any dispersible polymeric material that conducts ions and includes a fluorinated backbone, including anionic polymers, cationic polymers, NAFION®, polymers with N+H3R functional group, polymers with N+H2R2 functional group, polymers with N+HR3 functional group, polymers with N+R4 functional group, polymers with P+ functional group, fluorinated anionic polysiloxanes, and mixtures thereof. And once again, one skilled in the art will readily visualize other possible materials and combinations of the same.

As would be known to one skilled in the art; examples of fluorinated binder may include: any dispersible polymeric material that can be used to bind particles within an electrode and includes a fluorinated backbone, including PTFE dispersions, PTFE particles, PTFE-coated particles, anionic polymers, cationic polymers, NAFION®, polymers with N+H3R functional group, polymers with N+H2R2 functional group, polymers with N+HR3 functional group, polymers with N+R4 functional group, polymers with P+ functional group, fluorinated polysiloxanes, and mixtures thereof.

In a preferred embodiment, at least one electrode uses a mixture of hydrophilic and hydrophobic fluorinated binder. In a preferred embodiment, both electrodes are not flooded with liquid but the membrane may be in contact with aqueous electrolyte, allowing operation as a fuel cell and/or electrolyzer. In a preferred embodiment, the liquid electrolyte may be stored in an external reservoir and circulated through the electrode separator layer.

In yet another embodiment, the cell operates as a fuel cell with air as the oxidant. The liquid electrolyte in contact with the AEM prevents the AEM from being converted to its carbonate form. In one embodiment of the cell, the hydrogen electrode contains a non-Ni and non-Pt catalyst that is not severely poisoned by small quantities of carbon monoxide. In another embodiment of the cell, the anode operates on a hydrogen-containing fuel that also contains carbon monoxide and carbon dioxide.

EXAMPLES

Example 1—Fuel Cell or Reversible Fuel Cell

Figure 1A:
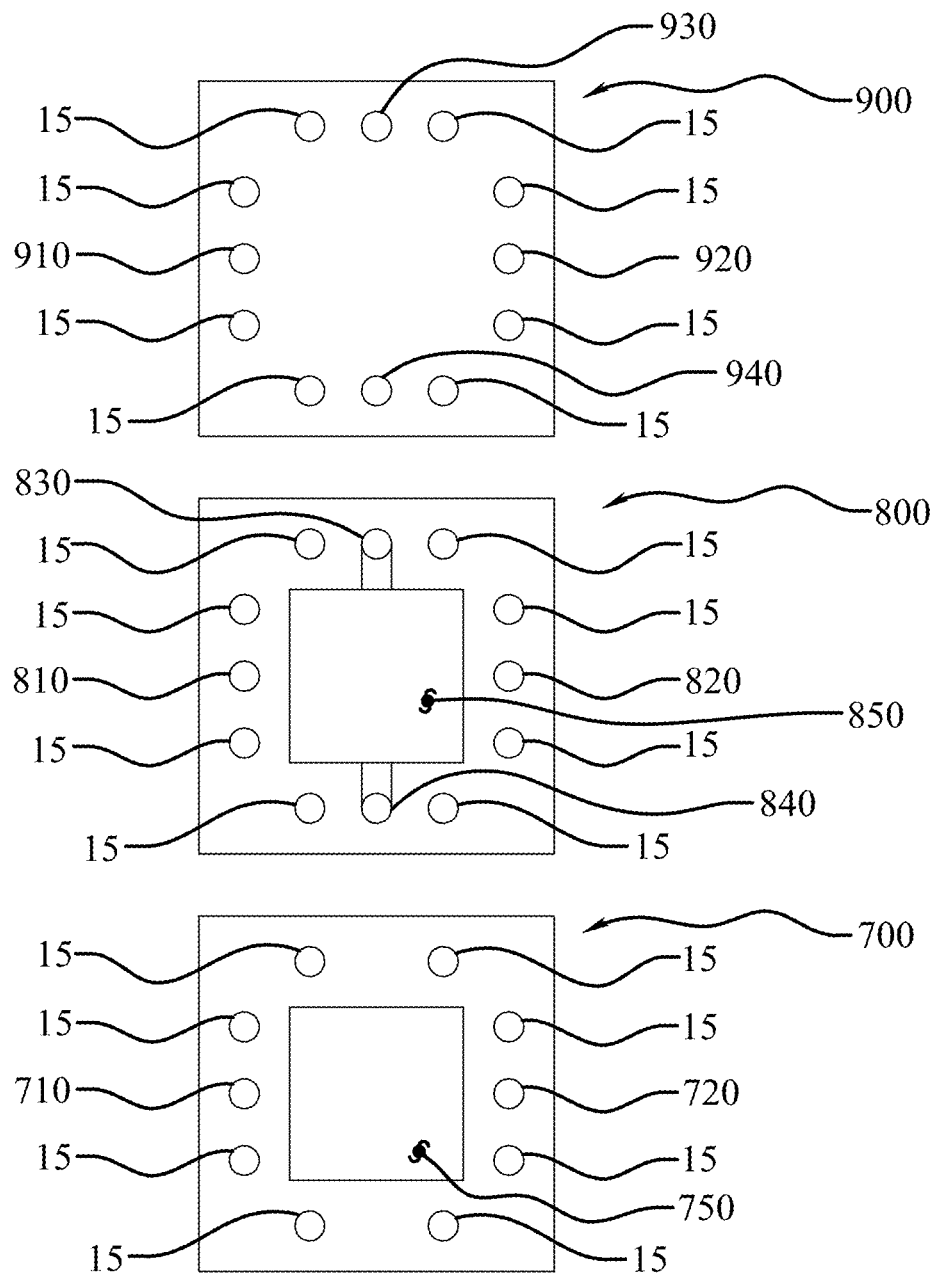
FIG. 1A shows a top plan view of an oxygen endplate, a second oxygen seal, and a first oxygen seal according to an embodiment of the instant invention.
Figure 1B:
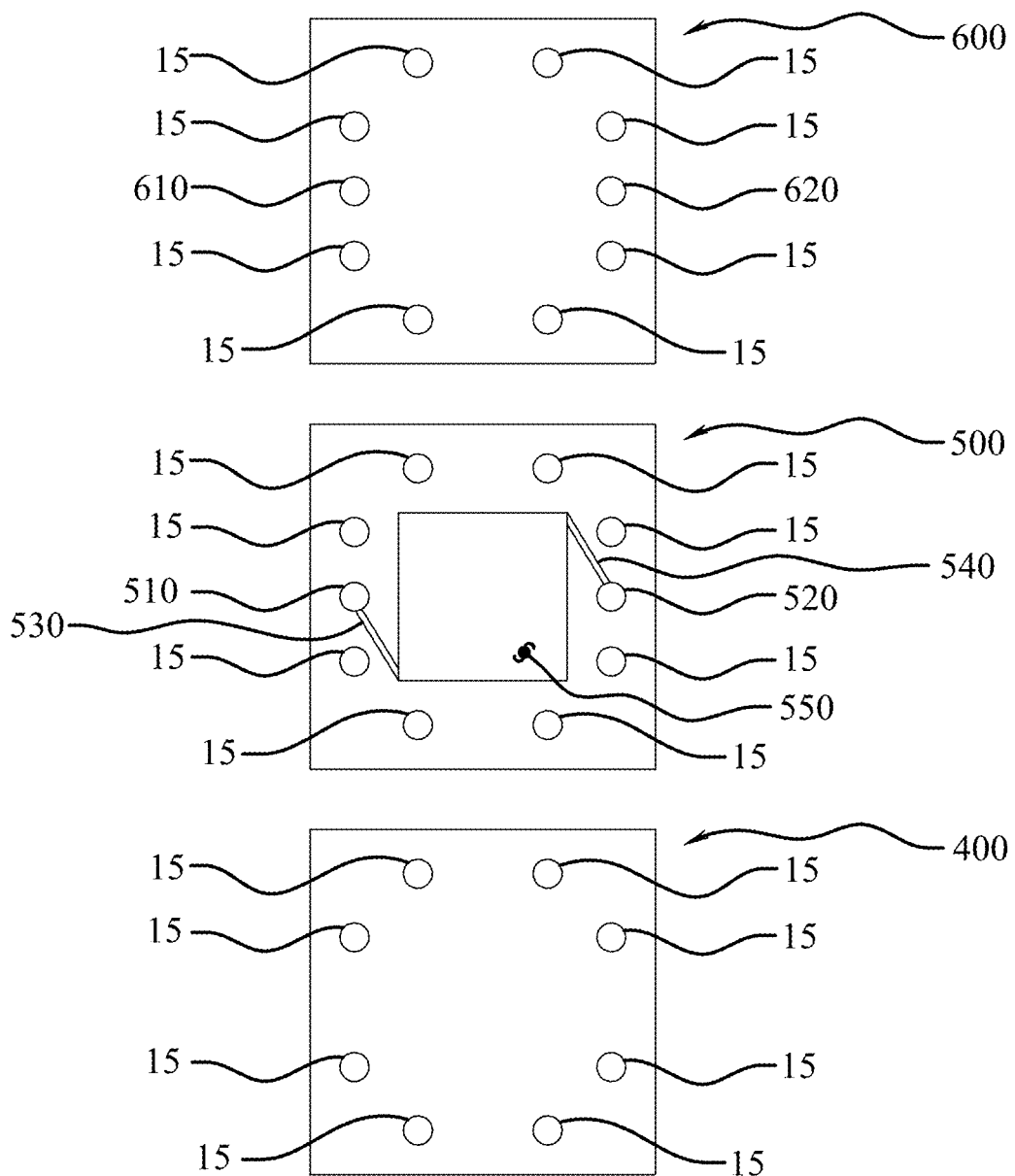
FIG. 1B shows a top plan view of an oxygen side membrane, an electrolyte layer, and a hydrogen side membrane according to an embodiment of the instant invention.
Figure 1C:
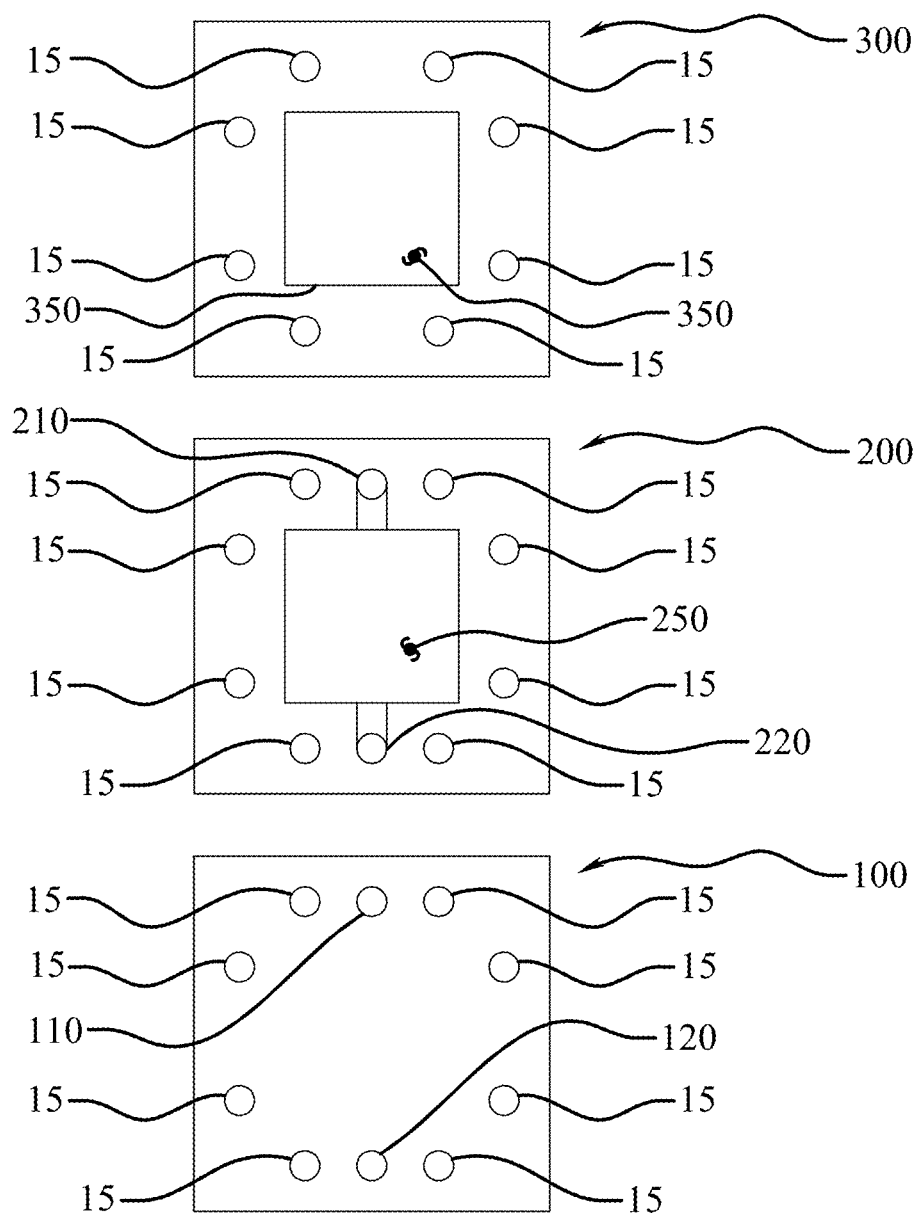
FIG. 1C shows a top plan view of a second hydrogen seal, a first hydrogen seal, and a hydrogen endplate according to an embodiment of the instant invention.
Figure 2A:
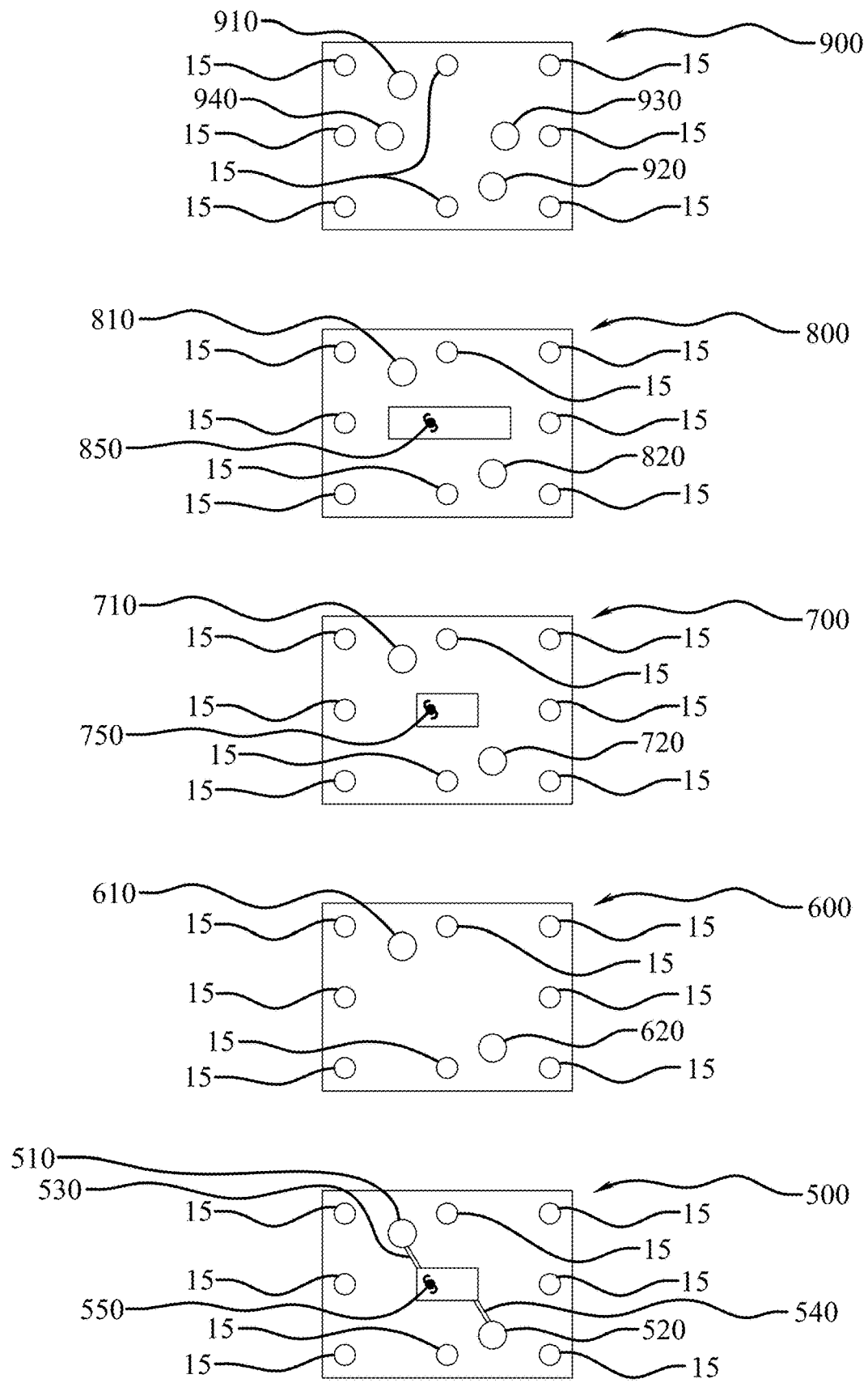
FIG. 2A shows a top plan view of an oxygen endplate, a second oxygen seal, a first oxygen seal, an oxygen side membrane and an electrolyte layer according to another embodiment of the instant invention.
Figure 2B:
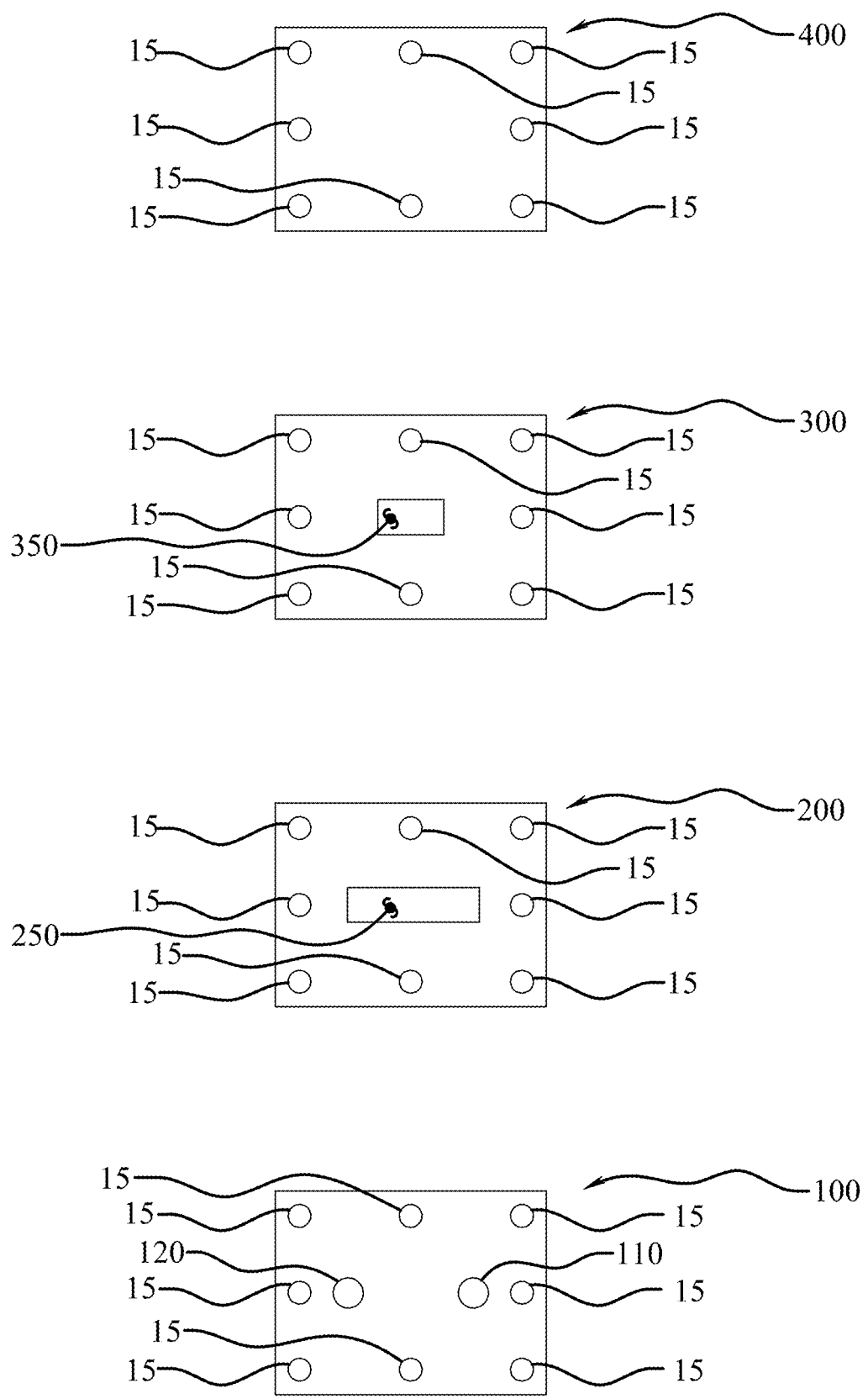
FIG. 2B shows a top plan view of a hydrogen side membrane, a second hydrogen seal, a first hydrogen seal, and a hydrogen endplate according to another embodiment of the instant invention.

FIGS. 1 and 2 show embodiments of the invention. One skilled in the art would know that the layers need not all be of the same thickness, and in fact, there may be a wide variation in layer thicknesses. In an exemplary embodiment, meant by way of example only and not limitation, the end plates may be as much as 10 cm thick, while the membrane layers may be as thin as 1 micron. This cell design may consist of a series of layers that are stacked to form the invention. One skilled in the art would appreciate that some layers may be combined, removed, and/or modified while still maintaining the functionality of the instant invention. The first layer may be the hydrogen electrode end plate (100). In an embodiment the plate may be made of stainless steel. The hydrogen end plate (100) may contain hydrogen inlet (110) and outlet ports (120), and a tab for current collection.

In some instances, such as an electrolysis cell, the hydrogen end plate (100) may only require a hydrogen outlet port (120). The next layer may be the first hydrogen seal (200). In an embodiment the seals are made of thin PTFE sheets. Seal layers could also be made of epoxy, glue(s), sealant(s), other polymers, or a combination thereof. Voids in the seal may extend to the hydrogen port(s) (210, 220) to allow gas in and/or out of the electrode. One skilled in the art would realize that in another embodiment, the ports (210, 220) could be co-extant with current collector mesh and flow field (250). This seal may frame the hydrogen electrode current collector (250), and the hydrogen flow field. In an embodiment, the hydrogen electrode current collector (250) may be stainless steel mesh. In an embodiment the second hydrogen seal frames a hydrogen electrode (350). In an embodiment, the hydrogen electrode (350) may be porous carbon paper coated with a mixture of catalyst and AEM ionomer. A preferred catalyst for the hydrogen electrode (350) may be 50-wt % ruthenium supported by Vulcan carbon. The hydrogen-side AEM layer (400) may sit on top of the second hydrogen seal (300) and the framed hydrogen electrode (350) layer.

The next layer may be the electrolyte layer (500). The electrolyte layer (500) may consist of a thin separator seal that frames a porous matrix (550). In one embodiment, the porous matrix may be nickel foam compressed to the thickness of the separator seal. In one embodiment, the separator seal also contains inlet (510) and exit ports (520) for aqueous electrolyte, preferably aqueous KOH. Channels (530, 540) in the electrolyte layer seal allow the electrolyte to flow into the bottom of the porous matrix (550) and out the top of the porous matrix (550). The oxygen-side AEM layer (600) may sit on top of the electrolyte layer (500) and the framed porous matrix layer (550).

Next, the first oxygen seal (700) may sit on top of the oxygen-side AEM (600). This seal may frame the oxygen electrode (750). The oxygen electrode (750) may be porous carbon paper coated with a mixture of catalyst and fluorinated ionomer/binder. A preferred catalyst for the oxygen electrode (750) may be a mixture of nitrogen-doped carbon and Fe/Co metal particles, including oxide and carbide phases. The fluorinated ionomer/binder may be a mixture of NAFION® and dispersed PTFE binder. In an embodiment a second oxygen seal (800) seals the oxygen electrode current collector (850). In this embodiment, the oxygen electrode current collector (850) may be stainless steel mesh. The oxygen-side seal may also contain through-ports (810, 820) for the electrolyte. Voids in the second seal (800) extend to the oxygen inlet (830) and/or outlet port(s) (840) to allow gas in and/or out of the electrode. One skilled in the art would realize that in another embodiment, the ports (830, 840) could be co-extant with current collector mesh and flow field (850).

The final layer may be the oxygen end plate (900). The oxygen end plate (900) may contain oxygen inlet (930) and outlet (940) ports. In some instances, such as an electrolysis cell, the plate may only require an oxygen outlet port (940). The end plate (900) may also contain ports (910, 920) for aqueous electrolyte to enter (910) and exit (920) the cell, and a tab for current collection. One skilled in the art could also appreciate how the design could be modified to enable a number or cell repeat units to be stacked in series. In such a design, the interior layers could use through-ports for the oxygen, hydrogen, and electrolyte. The oxygen and hydrogen ports could be offset in such an embodiment. Conductive interconnect plates could be used between cell repeat units to connect cells in series. To minimize crosstalk effects through the electrolyte between cells at the top and bottom of the series, a tortuous electrolyte flow path would be preferred. Isolation of conductive materials from electrolyte would be preferred, such as coating the interconnect electrolyte through-ports.

One skilled in the art could also envision a number of alternative electrolyte membrane designs. For example, an AEM could be mechanically supported by a porous layer or other mechanical support to stabilize a thin AEM. Further, in some uses for the cell design it may not be necessary to use two AEM layers per cell. One of the AEM layers could be replaced by a porous separator, such as a porous polypropylene.

One skilled in the art would also appreciate how this cell design could be part of a larger system. That system could include a return line for the exhausted liquid electrolyte to feed it back into an electrolyte reservoir. Liquid return lines from condensation collectors on the gas exits could also be connected in fluid communication with an electrolyte reservoir. One or both of the electrode gases could be in fluid communication with the electrolyte reservoir to maintain similar pressure between layers.

One skilled in the art could also appreciate how this cell design could be useful for other types of electrolysis, such as chlorine or bromine evolution. In such embodiments the electrolyte could be fed to the cell either through the electrolyte layer or one of the electrode chambers. Dry gas could be evolved from one of the electrodes. In other embodiments of the cell, an electrolyzer could utilize an oxygen depolarized cathode, wherein oxygen is fed to an electrode and oxygen reduction occurs in an electrode. In an embodiment of the cell, at least one of the current collectors could not be in contact with the electrolyte, and thus not be as susceptible to electrochemical degradation as flooded electrodes.

Example 2—Flooded Oxygen Electrode Electrolysis

In some embodiments of the instant invention, it may not be necessary to employ two AEM membranes per cell, one example being for flooded oxygen electrode electrolysis. In this embodiment, a series of layers may be stacked to form the cell. FIG. 1 shows the layers used in this embodiment, however, layers 500 and 600 would not be included in this embodiment. The first layer may be the hydrogen electrode end plate (100). In this embodiment the hydrogen end plate (100) may be made of stainless steel. The hydrogen end plate (100) may contain hydrogen inlet (110) and outlet ports (120), and a tab for current collection. In some instances, the hydrogen end plate (100) may only require the hydrogen outlet port (120).

The next layer may be the first hydrogen seal (200). In this embodiment the seals may be made of thin PTFE sheets. Seal layers could also be made of epoxy, glue(s), sealant(s), other polymers, or a combination thereof. Voids in the seal extend to the hydrogen port(s) (110, 120) to allow gas in and/or out of the electrode. This seal may frame the hydrogen electrode current collector (250). In this embodiment, the hydrogen electrode current collector (250) may be stainless steel mesh. The next layer may be the second hydrogen seal (300), which frames the hydrogen electrode (350). The hydrogen electrode (350) may be porous carbon paper coated with a mixture of catalyst and AEM ionomer. A preferred catalyst for the hydrogen electrode (350) may be 50-wt % ruthenium supported by Vulcan carbon. An AEM layer (400) may sit on top of the second hydrogen seal (300) and the framed hydrogen electrode layer (350). The AEM may be further mechanically supported by a porous matrix filled with aqueous electrolyte. In such an embodiment the porous matrix may be in contact with the flooded electrode, in this embodiment the oxygen electrode (750). The porous matrix may thus be located between the hydrogen side membrane (400) and the oxygen electrode (750).

Next, the first oxygen seal (700) sits on top of the hydrogen side membrane (AEM) (400). This first oxygen seal (700) may frame the oxygen electrode (750). The second oxygen seal (800) may sit on top of the first seal (700), and the second oxygen seal (800) may frame the oxygen electrode current collector (850). In an embodiment, the oxygen electrode current collector (850) may be nickel mesh and the oxygen electrode (750) may be nickel foam, coated with a mixture of catalyst and binder. In an embodiment, the oxygen electrode (750) may be flooded with an aqueous electrolyte. The electrolyte may be fed to the cell through the oxygen ingress (830) and egress (840) ports. A preferred catalyst for the oxygen electrode (850) may be a mixture of Fe/Co metal particles (including oxide and carbide phases). The binder may be a mixture of NAFION® and dispersed PTFE binder. The oxygen-side seal (800) may also contain inlet (810) and outlet (820) ports for the electrolyte and could also serve as an egress port for any gaseous product.

The final layer may be the oxygen end plate (900). The oxygen end plate (900) may include an inlet port (930) and an oxygen outlet port (940). The oxygen end plate (900) may also contain ports for aqueous electrolyte to enter (930) and exit (940) the cell, and a tab for current collection. One skilled in the art could also appreciate how the design could be modified to enable a number or cell repeat units to be stacked in series. In such a design, the interior layers could use through-ports for the oxygen, hydrogen, and electrolyte. Conductive interconnect plates could be used between cell repeat units to connect cells in series. To minimize crosstalk effects through the electrolyte between cells at the top and bottom of the series, a tortuous electrolyte flow path would be preferred. Isolation of conductive materials from electrolyte would be preferred, such as coating the interconnect electrolyte through-ports.

Example 3—Flooded Hydrogen Electrode Electrolysis

In some embodiments of the invention, it may not be necessary to employ two AEM membranes per cell, one example being for flooded hydrogen electrode electrolysis. In this embodiment, a series of layers may be stacked to form the cell. FIG. 1 shows the layers used in this embodiment, however, layers 500 and 600 would not be included in this embodiment.

The first layer may be the hydrogen electrode end plate (100). In an embodiment the hydrogen end plate (100) may be made of nickel. The hydrogen end plate (100) may contain hydrogen inlet (110) and outlet ports (120), and a tab for current collection. In some instances, the hydrogen end plate (100) may only require the hydrogen outlet port (120). The hydrogen end plate (100) may also contain ports for aqueous electrolyte to enter (110) and exit (120) the cell.

The next layer may be the first hydrogen seal (200). In this embodiment the seals may be made of thin PTFE sheets. Seal layers could also be made of epoxy, glue(s), sealant(s), other polymers, or a combination thereof. Voids in the seal (200) may extend to the hydrogen port(s) (210, 220) to allow gas in (210) and/or out (220) of the cell and electrolyte in (210) and/or out (220) of the cell. This seal (200) may frame the hydrogen electrode current collector (250). In an embodiment, the hydrogen electrode current collector (250) may be nickel mesh. The next layer may be the second hydrogen seal (300). The second hydrogen seal (300) may frame the hydrogen electrode (350). The hydrogen electrode (350) may be porous carbon paper coated with a mixture of catalyst and AEM ionomer. A preferred catalyst for the hydrogen electrode (350) may be 50-wt % ruthenium supported by Vulcan carbon. In an embodiment, the hydrogen electrode (350) may be flooded with an aqueous electrolyte. A hydrogen side membrane (AEM) layer (400) may sit on top of the second hydrogen seal (300) and the framed hydrogen electrode layer (350). In some embodiments, the hydrogen side membrane (AEM) layer (400) may be mechanically supported by a porous matrix that is filled with electrolyte. This porous matrix may be located between the solid hydrogen side membrane (AEM) layer (400) and the flooded hydrogen electrode (350).

Next, the first oxygen seal (700) sits on top of the hydrogen side membrane (AEM) (400). This seal (700) may frame the oxygen electrode (750). Next, the second oxygen seal (800) frames the oxygen current collector and flow field (850). In an embodiment, the oxygen electrode current collector (850) may be nickel mesh and the oxygen electrode (750) may be carbon paper coated with a mixture of catalyst and binder. A preferred catalyst for the oxygen electrode (750) may be a mixture of Fe/Co metal particles (including oxide and carbide phases). The binder may be a mixture of NAFION® and dispersed PTFE binder.

The final layer may be the oxygen end plate (900). The oxygen end plate (900) may include an oxygen outlet port (940). The end plate (900) may also include a tab for current collection. One skilled in the art could also appreciate how the design could be modified to enable a number or cell repeat units to be stacked in series. In such a design, the interior layers could use through-ports for the oxygen, hydrogen, and electrolyte. Conductive interconnect plates would be used between cell repeat units to connect cells in series. To minimize crosstalk effects through the electrolyte between cells at the top and bottom of the series, a tortuous electrolyte flow path would be preferred. Isolation of conductive materials from electrolyte would be preferred, such as coating the interconnect electrolyte through-ports.

Example 4—Reversible Fuel Cell Tests

Figure 3:
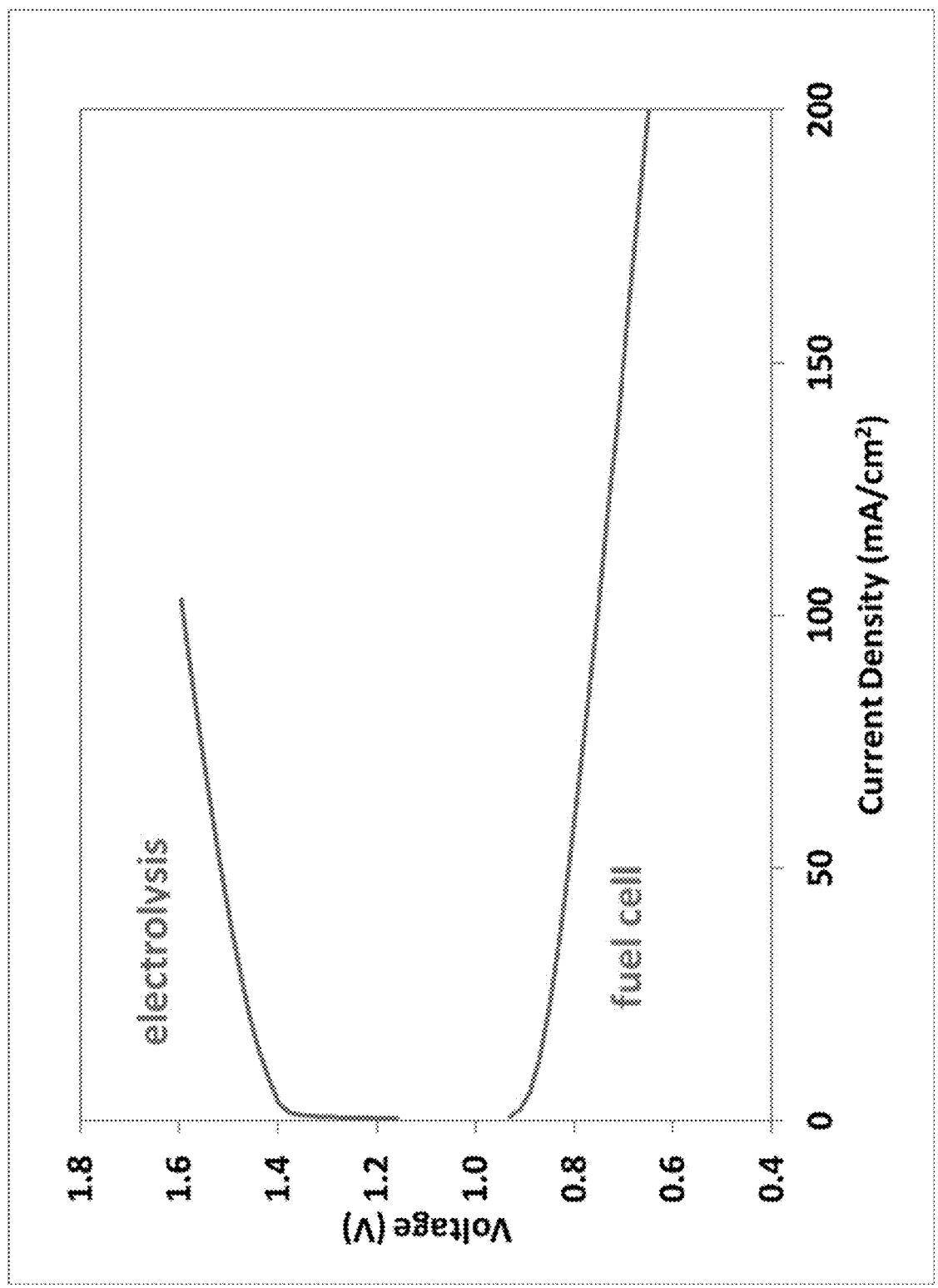
FIG. 3 shows exemplary current-voltage curves obtained for water electrolysis and fuel cell currents.

A cell with the design described in Example 1 was tested for reversible fuel cell and electrolysis operation. The cell had an active electrode area of 25 cm². Pure hydrogen and oxygen was sent to the respective electrodes at a flow rate of 300 sccm each, both humidified to a 25° C. dew point. Aqueous 5 M KOH electrolyte was circulated through the electrolyte layer at 3 cc/min. After purging trapped air, the gases and electrolyte were pressurized to 3 bar. The cell was initially heated to 60° C. using an external heater. Current-voltage curves were obtained at electrolysis and fuel cell voltages, as shown in FIG. 3. The same cell may be capable of excellent operation as either a fuel cell or an electrolyzer.

Figure 4:
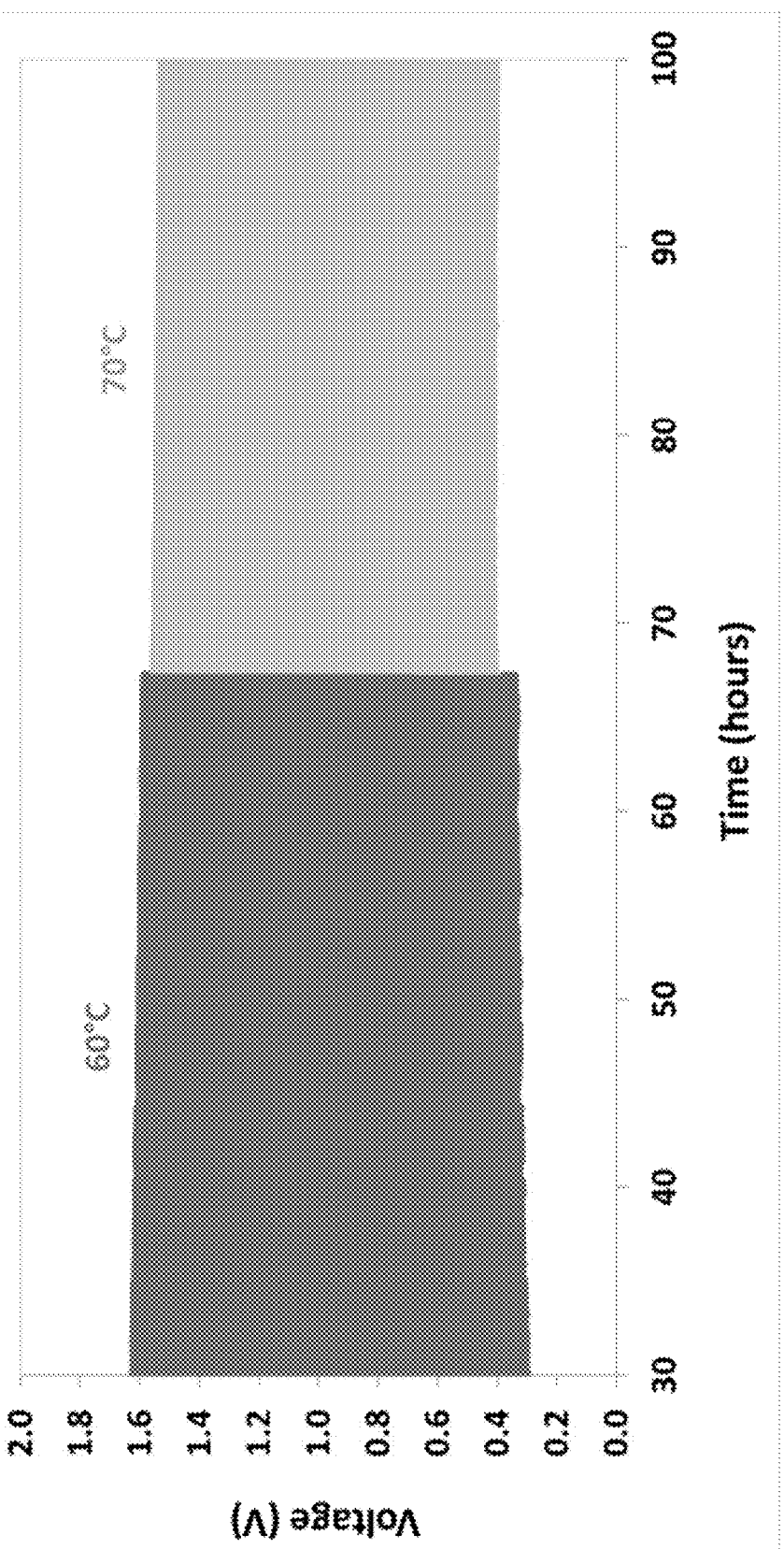
FIG. 4 shows exemplary accelerated degradation cycling for a reversible fuel cell embodiment.

Next, rapid cycles between fuel cell and electrolysis operation were performed, as shown in FIG. 4. These cycles involved 1 minute of fuel cell current load, followed by 1 minute of open circuit, followed by one minute of electrolysis load, followed by another minute of open circuit. The fuel cell load was 150 mA/cm². The electrolysis load was 50 mA/cm². After 30 hours of break-in period, 500 cycles were performed at 60° C., followed by 500 cycles at 70° C. Those skilled in the art would appreciate that most cell designs and catalysts, except for perhaps reversible PEM cells with Pt/Ir electrodes, suffer rapid degradation under these cycling conditions. Further, humidity control and stability would be challenging under this long-term operation. Surprisingly, this non-Pt and non-Ir cell design may be quite stable under these operating conditions.

Figure 5:
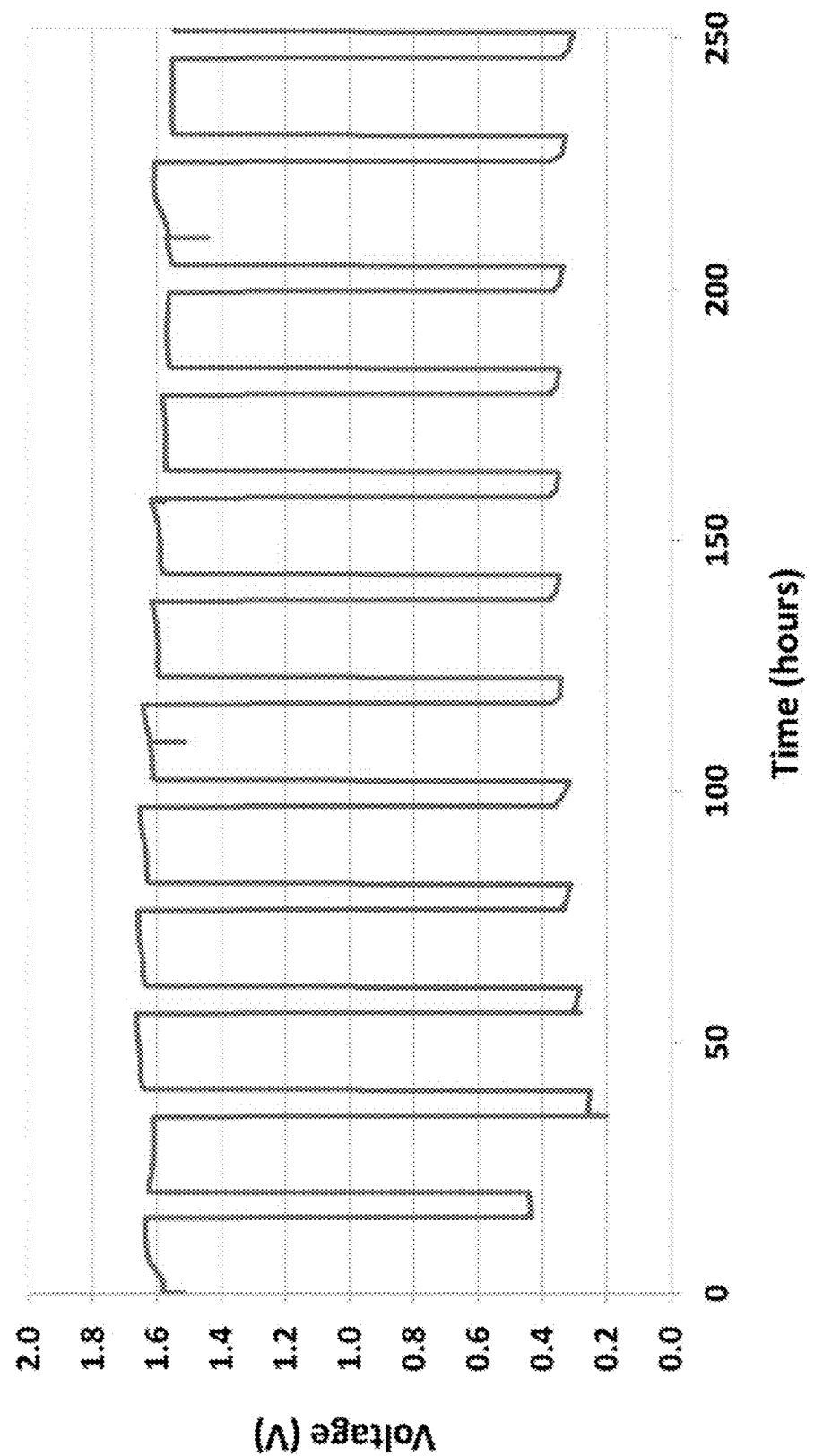
FIG. 5 shows exemplary steady-state cycling for a reversible fuel cell embodiment.

Finally, longer-term cycles between fuel cell and electrolysis operation were performed, as shown in FIG. 5. These cycles involved about 5 hours of fuel cell current load, followed by 10 minutes of open circuit, flowed by about 15 hours of electrolysis load, followed by another 10 minutes of open circuit. The fuel cell load was 150 mA/cm². The electrolysis load was 50 mA/cm². Over 250 hours, the cell operated reversibly as a fuel cell and electrolyzer. Those skilled in the art would appreciate that most cell designs and catalysts, except for reversible PEM cells with Pt/Ir electrodes, suffer rapid degradation under these cycling conditions. Further, humidity control and stability would be challenging under this long-term operation. Surprisingly, this non-Pt and non-Ir cell design may be also quite stable under these operating conditions.

Example 5—Steady-State Electrolysis Tests

Figure 6:
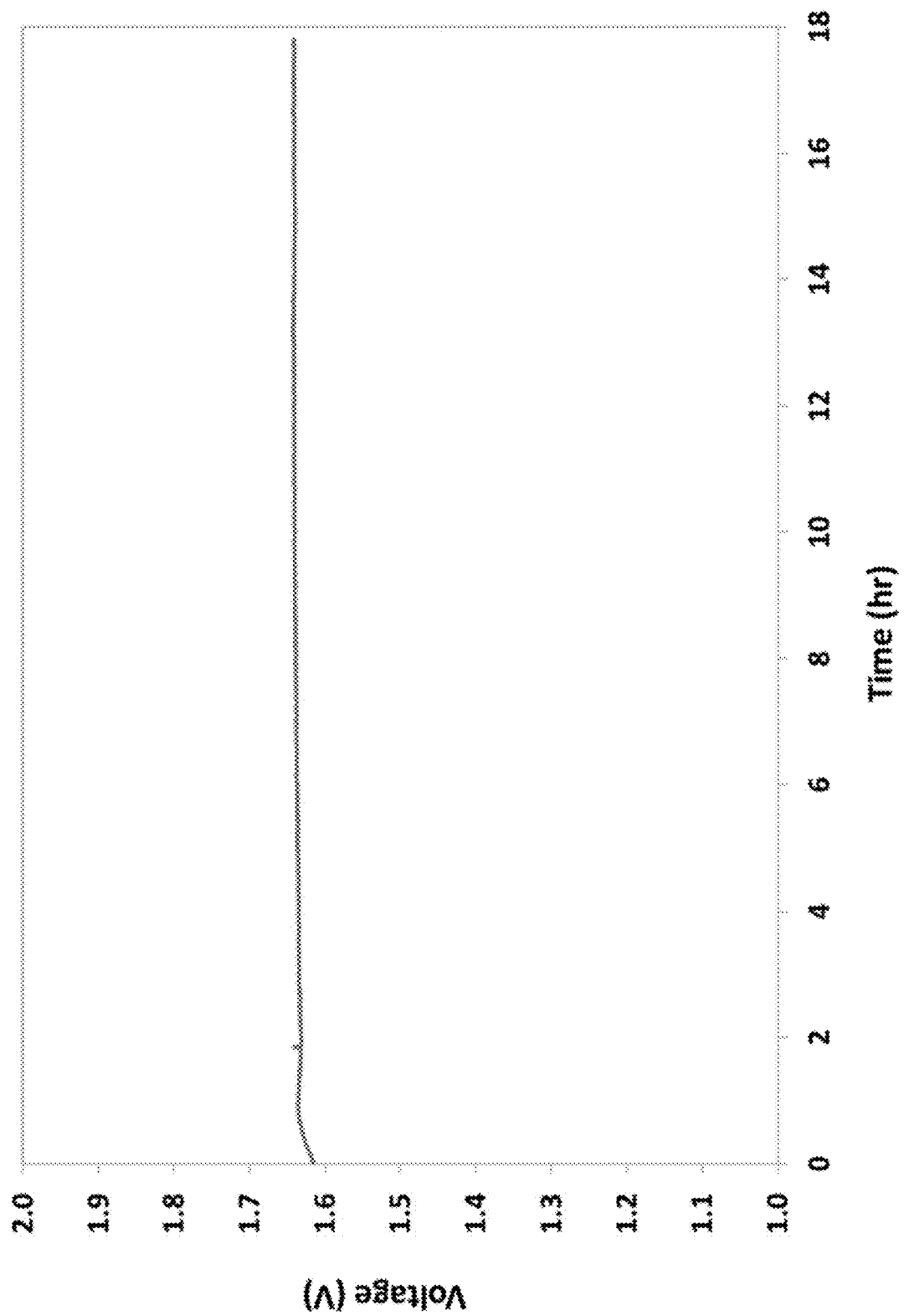
FIG. 6 shows exemplary steady-state voltage for an oxygen-flooded electrode embodiment.

A cell with the design described in Example 2 was tested for steady-state electrolysis operation. The cell had an active electrode area of 25 cm2. Nitrogen at 3 bar was sent to the hydrogen electrode (cathode) at a flow rate of 30 sccm. Aqueous 5 M KOH electrolyte was circulated through the oxygen electrode chamber at 3 cc/min. After purging trapped air, the gases and electrolyte were pressurized to 3 bar. The cell was initially heated to 60° C. using an external heater. The cell was operated under steady-state electrolysis for 18 hours at 50 mA/cm² (see FIG. 6). The voltage was steady throughout the operation. In further testing (data not shown), the current was increased in 50 mA/cm² increments every 2 hours up to 250 mA/cm² while testing the purity of the hydrogen and oxygen with a gas chromatograph. Greater than 99.99% selectivity to hydrogen and oxygen versus other permanent gases was detected.

Example 6—Fluorinated NAFION® Versus Hydrocarbon Binder

Reversible oxygen electrode operation was tested for a cell using the design embodiment described in Example 3. In this cell, a nickel mesh was used for the hydrogen electrode, and the hydrogen electrode was flooded with 5 M KOH. The active electrode area was 2-cm². The oxygen flow rate was 50 sccm. The cell was tested at 45° C. for reversible fuel cell and electrolysis operation. A reference electrode was placed in the electrolyte and compared to the oxygen electrode. The voltage of the oxygen electrode is graphed in FIGS. 7 and 8 versus a reversible hydrogen electrode reference for two different embodiments, respectively.

FIG. 7 shows oxygen electrode performance using a commercial hydrocarbon AEM ionomer in the electrode. FIG. 8 shows the oxygen electrode performance using a mixture of NAFION® (functionalized fluorocarbon) ionomer/binder and PTFE in the electrode. As expected, using hydrocarbon AEM ionomer in the non-flooded oxygen electrode performs well initially under fuel cell or electrolysis currents. The AEM ionomer extends ion conductivity into the electrode, increasing performance of the electrode and lowering operating voltage at a given current density. In the electrode prepared with NAFION® and PTFE, initial performance was similar to the electrode loaded with AEM ionomer. This result is surprising because NAFION® is not designed to conduct anions. The electrode loaded with hydrocarbon AEM ionomer degrades as current is cycled between fuel cell and electrolysis operation. This could be explained by oxidation of the hydrocarbon ionomer under electrolysis operation, and a resulting loss in ion conductivity.

Conversely, the electrode with NAFION® fluorocarbon ionomer/binder, and all other catalysts, components, and operating conditions being identical, does not degrade rapidly. Some spikes in electrolysis voltage were observed during cycling, but this was likely due to humidity control in the electrode, and only lasts for a few seconds before the voltage returns to typical operating values.

As one skilled in the art would realize, and by way of example only and not limitation, it is possible that a small amount of aqueous electrolyte permeates through the AEM into the oxygen electrode, thus extending ionic conductivity into the electrode. However, the excellent oxygen reduction performance of the electrode indicates that gas is still accessible to the electrode catalyst, and thus the electrode is not fully flooded. Inspection of the electrode after testing confirmed that the membrane side of the oxygen electrode was wetted and the current collector and flow field side of the electrode was dry.

What is claimed, then, in multiple embodiments, is an electrochemical cell (10) and a method of using the same. The electrochemical cell (10) may have at least one electrode (350, 750) substantially free of liquid water and in electrochemical contact with an electrolyte layer (400, 500) (500, 600). The electrochemical cell (10) may further have at least one gas impermeable anion-conducting membrane (400, 600) having a first side and a second side, and be in electrochemical contact with the electrode (350, 750) on the first side, and in electrochemical contact with a porous non-electrode layer (550) permeated with aqueous liquid on the second side of the membrane (400, 600). In certain embodiments, the aqueous liquid may be a liquid electrolyte having a pH equal to or greater than 7.0.

In various embodiments, the electrolyte layer (400, 500) (500, 600) may include a second gas-impermeable membrane (400, 600). The porous non-electrode layer (550) may have an opposing first side and a second side, wherein each membrane (400, 600) may be located on one of the opposing sides of the porous non-electrode layer (550) that is permeated by a high pH aqueous liquid.

In some embodiments, the electrochemical cell (10) may have a second electrode (350, 750) where the second electrode (350, 750) is equal to or more than 50% filled with liquid electrolyte. In some embodiment's, the second electrode (350, 750) may be an anode, while in other embodiments, the second electrode (350, 750) may be a cathode. As would be appreciated by one skilled in the art, in some embodiments, the electrochemical cell (10) may be a fuel cell, and/or a fuel cell and water electrolyzer. In some further embodiments, the electrochemical cell (10) may be an electrolyzer with an oxygen depolarized cathode.

In a series of embodiments, the electrolyte layer (400,500) (500,600) may include a porous non-electrode layer (550) that is electrically conductive. In some further embodiments, evolved gas may be electrochemically pressurized within the electrochemical cell (10). In yet other embodiments, the electrochemical cell (10) may use hydrophilic fluorinated binder in a gas-evolving evolving electrode (750), while in others, may use hydrophilic fluorinated binder in an oxygen-evolving electrode (750). The electrochemical cell (10) may use hydrophilic fluorinated binder in an oxygen-evolving electrode (750).

In some embodiments, the electrochemical cell (10) may use a mixture of hydrophilic fluorinated binder and hydrophobic fluorinated binder in a gas-evolving electrode (750), and in some embodiments, the electrochemical cell (10) may use a mixture of hydrophilic fluorinated binder and hydrophobic fluorinated binder in an oxygen-evolving electrode (750). In still others, the electrochemical cell (10) may use a mixture of hydrophilic fluorinated binder and hydrophobic fluorinated binder in a gas-evolving electrode (750).

In a further series of embodiments, an electrochemical cell (10) may have multiple layers, including a hydrogen end plate (100) further having a hydrogen ingress port (110) and a hydrogen egress port (120). Such a layer may be in electrochemical contact with a first hydrogen seal layer (300) further having a hydrogen electrode (350), in electrochemical contact with; a hydrogen side membrane (400). Such a layer may then be in electrochemical contact with an electrolyte layer (500) further having an electrolyte ingress port (510), an electrolyte egress port (520), an electrolyte inlet channel (530), and electrolyte outlet channel (540), and a porous non-electrode layer (550). This layer may be in electrochemical contact with an oxygen side membrane (600), and then be in electrochemical contact with a first oxygen seal layer (700) having an oxygen electrode (750). The above may then be in electrochemical contact with an oxygen end plate (900) further comprising an oxygen ingress port (930) and an oxygen egress port (940).

In some embodiments, meant by way of example only and not limitation, the electrochemical cell (10) may further include a second hydrogen seal layer (200) having a hydrogen ingress port (210), a hydrogen egress port (220), and an hydrogen current collector and flow field (250) in electrochemical contact with both the hydrogen seal layer (300) and the hydrogen end plate (100). In others, a second oxygen seal layer (800) may further include an electrolyte ingress port (810), an electrolyte egress port (820), an oxygen ingress port (830), an oxygen egress port (840) and a current collector mesh and flow field (850), in electrochemical contact with both the oxygen seal layer (700) and the hydrogen end plate (900).

As would be seen by one skilled in the art, the hydrogen seal layers (200, 300) may be formed as a unitary structure, while equally well, the oxygen seal layers (700, 800) may be formed as a unitary structure.

A method of using an electrochemical cell (10) to generate gas from an electrolyte could include the step of feeding electrolyte to a non-electrode porous layer in electrochemical contact with a first side of an anion-conducting membrane having a first side and a second side, wherein the second side of the anion-conducting membrane is in electrochemical contact with a substantially non-flooded gas-evolving electrode layer. Such a method could include that the substantially non-flooded gas-evolving electrode layer may be less than 50% flooded with electrolyte.

Having a substantially non-flooded gas-evolving electrode layer facilitate gas flow within the cell (10) and minimizes corrosion caused by having electrolyte in fluid contact with the current collector.

Numerous alterations, modifications, and variations of the preferred embodiments disclosed herein will be apparent to those skilled in the art and they are all anticipated and contemplated to be within the spirit and scope of the disclosed specification. For example, although specific embodiments have been described in detail, those with skill in the art will understand that the preceding embodiments and variations can be modified to incorporate various types of substitute and or additional or alternative materials, relative arrangement of elements, order of steps and additional steps, and dimensional configurations. Accordingly, even though only few variations of the products and methods are described herein, it is to be understood that the practice of such additional modifications and variations and the equivalents thereof, are within the spirit and scope of the method and products as defined in the following claims. The corresponding structures, materials, acts, and equivalents of all means or step plus function elements in the claims below are intended to include any structure, material, or acts for performing the functions in combination with other claimed elements as specifically claimed.

We claim:

1. An electrochemical cell (10) comprising:
    at least one electrode (350, 750) substantially free of liquid water and in electrochemical contact with an electrolyte layer (400, 500)(500, 600), further comprising at least one gas impermeable anion-conducting membrane (400, 600) having a first side and a second side, in electrochemical contact with the electrode (350, 750) on the first side, and in electrochemical contact with a porous non-electrode layer (550) permeated with aqueous liquid on the second side of the membrane (400, 600).

2. The device according to claim 1, wherein the aqueous liquid is a liquid electrolyte having a pH equal to or greater than 7.0.

3. The device according to claim 1, where the electrolyte layer (400, 500)(500, 600) further comprises a second gas-impermeable membrane (400, 600), and the porous non-electrode layer (550) has an opposing first side and a second side, wherein each membrane (400, 600) is located on one of the opposing sides of the porous non-electrode layer (550) that is permeated by an aqueous liquid having a pH equal to or greater than 7.0.

4. The device according to claim 1 further comprising a second electrode (350, 750) wherein the second electrode (350, 750) is equal to or more than 50% filled with liquid electrolyte.

5. The device according to claim 4 wherein the second electrode (350, 750) is an anode.

6. The device according to claim 4 wherein the second electrode (350, 750) is a cathode.

7. The device according to claim 1 wherein the electrochemical cell (10) is a fuel cell.

8. The device according to claim 1 wherein the electrochemical cell (10) is a fuel cell and water electrolyzer.

9. The device according to claim 1 wherein the electrochemical cell (10) is an electrolyzer with an oxygen depolarized cathode.

10. The device according to claim 1 wherein the electrolyte layer (400,500)(500,600) further comprises a porous non-electrode layer (550) that is electrically conductive.

11. The device according to claim 1, wherein evolved gas is electrochemically pressurized within the electrochemical cell (10).

12. The device according to claim 3, wherein evolved gas is electrochemically pressurized within the electrochemical cell (10).

13. The device according to claim 1 wherein the electrochemical cell (10) uses hydrophilic fluorinated binder in a gas-evolving evolving electrode (750).

14. The device according to claim 1 wherein the electrochemical cell (10) uses hydrophilic fluorinated binder in an oxygen-evolving electrode (750).

15. The device according to claim 1 wherein the electrochemical cell (10) uses hydrophobic fluorinated binder in an oxygen-evolving electrode (750).

16. The device according to claim 1 wherein the electrochemical cell (10) uses a mixture of hydrophilic fluorinated binder and hydrophobic fluorinated binder in a gas-evolving electrode (750).

17. The device according to claim 3 wherein the electrochemical cell (10) uses a mixture of hydrophilic fluorinated binder and hydrophobic fluorinated binder in a gas-evolving electrode (750).

18. A method of using an electrochemical cell (10) to generate gas from an electrolyte comprising the step of:
    feeding electrolyte to a non-electrode porous layer in electrochemical contact with a first side of an anion-conducting membrane having a first side and a second side, wherein the second side of the anion-conducting membrane is in electrochemical contact with gas-evolving electrode layer that is less than 50% flooded with an electrolyte.

* * * * *